United States Patent
Brahma et al.

(10) Patent No.: US 11,255,245 B2
(45) Date of Patent: Feb. 22, 2022

(54) SYSTEMS AND METHODS FOR CATALYST SENSOR DIAGNOSTICS

(71) Applicant: Cummins Inc., Columbus, IN (US)

(72) Inventors: Avra Brahma, Fishers, IN (US); Vivek Bithar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 123 days.

(21) Appl. No.: 16/466,923

(22) PCT Filed: Dec. 6, 2017

(86) PCT No.: PCT/US2017/064848
§ 371 (c)(1),
(2) Date: Jun. 5, 2019

(87) PCT Pub. No.: WO2018/106771
PCT Pub. Date: Jun. 14, 2018

(65) Prior Publication Data
US 2019/0353075 A1    Nov. 21, 2019

Related U.S. Application Data

(60) Provisional application No. 62/432,290, filed on Dec. 9, 2016.

(51) Int. Cl.
*F01N 11/00* (2006.01)

(52) U.S. Cl.
CPC ...... *F01N 11/00* (2013.01); *F01N 2900/0416* (2013.01)

(58) Field of Classification Search
CPC ......... Y02T 10/47; Y02T 10/40; Y02T 10/12; Y02T 10/22; Y02T 10/24; F02D 41/1495;
(Continued)

(56) References Cited

U.S. PATENT DOCUMENTS

| | | |
|---|---|---|
| 5,077,970 A | 1/1992 | Hamburg |
| 5,159,810 A | 11/1992 | Grutter et al. |

(Continued)

FOREIGN PATENT DOCUMENTS

| | | |
|---|---|---|
| EP | 1 167 726 | 1/2002 |
| JP | 2006-183591 | 7/2006 |

(Continued)

OTHER PUBLICATIONS

Partial Supplementary European Search Report EP Application No. 17879567.0, dated Jun. 29, 2020, 12 pages.

(Continued)

*Primary Examiner* — Quan-Zhen Wang
*Assistant Examiner* — Rajsheed O Black-Childress
(74) *Attorney, Agent, or Firm* — Foley & Lardner LLP (57) ABSTRACT

An apparatus includes a processing circuit structured to receive a first signal indicative of an upstream air-fuel equivalence ratio from a first sensor positioned upstream of an intake of a catalyst, receive a second signal indicative of a downstream air-fuel equivalence ratio from a second sensor positioned downstream of the intake of the catalyst, determine an actual oxygen storage capacity of the catalyst based at least in part on the received first signal and the received second signal, compare the actual oxygen storage capacity to a maximum storage capacity, and provide a fault signal in response to the actual oxygen storage capacity exceeding the maximum storage capacity. The apparatus also includes a notification circuit structured to provide a notification indicating that the second sensor is faulty in response to receiving the fault signal.

12 Claims, 8 Drawing Sheets

(58) Field of Classification Search
CPC .......... F02D 41/1441; F02D 2041/228; F02D 41/1408; F02D 41/1454; F02D 2200/0802; F02D 2200/0812; F02D 2200/0816; F02D 41/0235; F02D 41/029; F02D 41/0295; F02D 41/123; F02D 41/1456; F02D 41/146; F02D 41/1474; F02D 41/1494; F02D 41/221; F02D 41/222; F02D 41/3017; F02D 41/3076; F01N 11/007; F01N 2550/02; F01N 2560/025; F01N 11/00; F01N 2550/00; F01N 2560/14; F01N 2900/0416; F01N 3/101; F01N 11/005; F01N 13/009; F01N 2550/04; F01N 2560/026; F01N 2900/1402; F01N 2900/1602; F01N 2900/1606; F01N 2900/1624; F01N 3/035; F01N 3/20; F01N 3/2066; F01N 9/002

See application file for complete search history.

(56) References Cited

U.S. PATENT DOCUMENTS

| | | | |
|---|---|---|---|
| 5,228,426 | A | 7/1993 | Pursifull et al. |
| 5,423,203 | A | 6/1995 | Namiki et al. |
| 5,801,295 | A | 9/1998 | Davey et al. |
| 6,804,951 | B2 | 10/2004 | Nader et al. |
| 6,961,653 | B2 | 11/2005 | Maki |
| 2004/0226282 | A1* | 11/2004 | Hattori ................ F02D 41/1495 60/285 |
| 2014/0230413 | A1 | 8/2014 | Yezerets et al. |
| 2015/0377102 | A1* | 12/2015 | Yezerets ............... F01N 3/2066 60/274 |
| 2016/0186630 | A1 | 6/2016 | Osburn et al. |

FOREIGN PATENT DOCUMENTS

| | | |
|---|---|---|
| JP | 2012-002070 | 1/2012 |
| WO | WO-2016/013226 | 1/2016 |

OTHER PUBLICATIONS

International Search Report and Written Opinion for International Application No. PCT/US2017/064848, dated Apr. 13, 2018, 11 pages.

\* cited by examiner

SYSTEMS AND METHODS FOR CATALYST SENSOR DIAGNOSTICS

CROSS-REFERENCE TO RELATED PATENT APPLICATIONS

This application claims the benefit of and priority to U.S. Provisional Patent Application No. 62/432,290, filed Dec. 9, 2016, which is incorporated herein by reference in its entirety and for all purposes.

TECHNICAL FIELD

The present disclosure relates to exhaust aftertreatment systems. More particularly, the present disclosure relates to operating an exhaust aftertreatment diagnostic system.

BACKGROUND

Emission regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emissions quality of engines and set acceptable emission standards, to which all engines must comply by law. For example, the California Air Resources Board (CARB) requires engine systems to diagnose any sensors used in emissions control systems for errors that may affect emission levels.

Three-way catalysts are a key component of emissions control systems in Stoichiometric Spark-Ignited engines, such as those fueled by gasoline, ethanol, and natural gas. CARB requires engine systems to monitor the three-way catalyst(s) for any malfunctions that might lead to system emissions exceeding a pre-defined threshold.

SUMMARY

One embodiment relates to an apparatus that includes a processing circuit structured to receive a first signal indicative of an upstream air-fuel equivalence ratio from a first sensor positioned upstream of an intake of a catalyst, receive a second signal indicative of a downstream air-fuel equivalence ratio from a second sensor positioned downstream of the intake of the catalyst, determine an actual oxygen storage capacity of the catalyst based at least in part on the received first signal and the received second signal, compare the actual oxygen storage capacity to a maximum storage capacity, and provide a fault signal in response to the actual oxygen storage capacity exceeding the maximum storage capacity. The apparatus also includes a notification circuit structured to provide a notification indicating that the second sensor is faulty in response to receiving the fault signal.

Another embodiment relates to an apparatus that includes a processing circuit structured to receive a first signal indicative of an upstream air-fuel equivalence ratio from a first sensor positioned upstream of an intake of a catalyst, receive a second signal indicative of a downstream air-fuel equivalence ratio from a second sensor positioned downstream of the intake of the catalyst, determine a statistical metric of the upstream air-fuel equivalence ratio based on the first signal, determine a statistical metric of the downstream air-fuel equivalence ratio based on the second signal, compare the statistical metrics to determine a differential, and provide a fault signal in response to the statistical metric differential exceeding a predetermined threshold. The apparatus also includes a notification circuit structured to provide a notification indicating that the second sensor is faulty in response to receiving the fault signal.

Another embodiment relates to an apparatus that includes a processing circuit structured to receive a first signal indicative of an upstream air-fuel equivalence ratio from a first sensor positioned upstream of an intake of a catalyst. The first signal defines a duty cycle. The processing circuit is further structured to receive a second signal indicative of a downstream air-fuel equivalence ratio from a second sensor positioned downstream of the intake of the catalyst, adjust the duty cycle based at least in part on the second signal, and provide a fault signal in response to the duty cycle not meeting a duty cycle range for a predetermined period of time. The apparatus also includes a notification circuit structured to provide a notification indicating that the second sensor is faulty in response to receiving the fault signal.

Another embodiment relates to an apparatus that includes a processing circuit structured to receive a first signal indicative of an upstream air-fuel equivalence ratio from a first sensor positioned upstream of an intake of a catalyst, receive a second signal indicative of a downstream air-fuel equivalence ratio from a second sensor positioned downstream of the intake of the catalyst, provide a control signal to an engine to produce a desired first signal, predict an expected second signal based at least in part on the desired first signal, compare the first signal to the desired first signal, determine a second signal differential between the second signal and the expected second signal when the first signal is equal to the desired first signal, and provide a fault signal in response to the second signal differential exceeding a threshold differential. The apparatus also includes a notification circuit structured to provide a notification indicating that the second sensor is faulty in response to receiving the fault signal.

Another embodiment relates to an apparatus that includes a processing circuit structured to receive a key-on or key-off signal from an ignition circuit, provide a fuel cut or lean run signal to an engine, receive a lambda signal indicative of a downstream air-fuel equivalence ratio from a sensor positioned downstream of an intake of a catalyst, and provide a fault signal in response to the lambda signal indicating the downstream air-fuel equivalence ratio is less than one. The apparatus also includes a notification circuit structured to provide a notification indicating that the sensor is faulty in response to receiving the fault signal.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for model based catalyst diagnostics. The various concepts introduced above and discussed in greater detail below may be implemented in any number of ways, as the concepts described are not limited to any particular manner of implementation. Examples of specific implementations and applications are provided primarily for illustrative purposes.

Referring the figures generally, the various embodiments disclosed herein relate to systems, apparatuses, and methods for operating an engine system and monitoring or diagnosing a stuck catalyst sensor of an exhaust aftertreatment system (e.g., a three-way catalyst). The engine system includes an internal combustion engine that in one embodiment is a spark-ignition engine. In other embodiments, another engine type making use of stoichiometric combustion may be used. For example, a compression-ignition engine (e.g., a diesel engine) may be arranged to operate using an exhaust aftertreatment system as described herein. The engine system also includes an engine exhaust pipe that provides engine exhaust gases to a catalyst. A catalyst exhaust pipe is connected to the catalyst and provides treated exhaust gas to a muffler or another component of the exhaust aftertreatment system. An engine control system includes a controller, a first exhaust gas oxygen sensor (EGO) arranged to sense a condition of the engine exhaust gas, and a second (or secondary) EGO arranged to sense a condition of the treated exhaust gas. In order to regulate a proper Air-Fuel Ratio to the catalyst or diagnose the catalyst for malfunction, the second EGO sensor may be located downstream of the three-way catalyst or at any location upstream such that there is a volume of the catalyst between the second EGO sensor and the first EGO sensor. The EGO sensors may be heated or unheated, or of a narrow-band (i.e., switching) or wide-band type of sensor.

The controller receives lambda signals from the first EGO sensor and the second EGO sensor indicative of an air:fuel equivalence ratio (lambda $\lambda$). When lambda $\lambda$ is less than one (1), the lambda signal indicates that the air:fuel mixture in the exhaust gas is rich. When the lambda $\lambda$ is greater than one (1), the lambda signal indicates that the air:fuel mixture in the exhaust gas is lean. A lambda signal of one (1) indicates stoichiometric balance. Comparisons of a first lambda signal received from the first EGO sensor and a second lambda signal received from the second EGO sensor can be used to diagnose various attributes and faults of the catalyst and the first and second EGO sensors.

Within this document, the term motoring, exit motoring, and dithering describe three operational conditions of the engine that occur in response to user (e.g., a driver) input. Motoring occurs when no fuel is being provided to the engine. For example, motoring may occur when the user is braking, coasting downhill, or when a gear shift is occurring. Typically, motoring occurs in a passenger or commercial vehicle for between one and fifteen seconds for any given motoring condition, though other time periods occur more occasionally. During a motoring condition, the exhaust gas will be lean. Exit motoring occurs when the user causes fuel to be provided to the engine directly following a motoring condition. The exit motoring condition may last between one and two seconds, or may be longer. During the exit motoring condition, extra fuel is provided to the engine to quickly enrich the catalyst and desorb excess oxygen from the catalyst. Dithering occurs during normal operation of the engine when fuel is being provided. In the dithering condition, the air:fuel mixture of the exhaust gas will alternate between rich and lean.

The engine control system monitors the catalyst to confirm that the catalyst is functioning properly and also monitors the EGO sensors to confirm that the EGO sensors are not stuck or otherwise faulty. In one embodiment, the controller sets a baseline oxygen storage capacity of the catalyst corresponding to a new catalyst. Then, using the first EGO sensor and the second EGO sensor, a current storage capacity is determined. If the current storage capacity is determined to be larger than the baseline storage capacity, the controller indicates that one of the first and second EGO sensors is stuck (i.e., indicating a lean or rich lambda $\lambda$ inaccurately).

In another embodiment, the controller monitors the first lambda signal received from the first EGO sensor and the second lambda signal received from the second EGO sensor over time. The controller determines a first median lambda of the first lambda signal, and a second median lambda of the second lambda signal. The controller then determines a median differential between the first median lambda and the second median lambda. Over time, the controller continues to determine and monitor the median differential. If the median differential exceeds a predetermined threshold value, then the controller indicates that one of the first and second EGO sensors is stuck.

In another embodiment, the first EGO sensor is arranged at an inlet of the catalyst and the second EGO sensor is arranged downstream of the inlet of the catalyst. The controller controls the air:fuel ratio provided to the engine based at least in part on a duty cycle of the first EGO sensor. The duty cycle is defined by the dithering of the first lambda signal as it switches between indicating a lean and rich air:fuel mixture over time. A normally operating engine system will operate at about a 50% duty cycle. In other words, the first lambda signal will indicate that the air:fuel mixture is rich about half the time, and lean about half the time. In some embodiments, it is preferred to run slightly rich at a 55% duty cycle indicating that the air:fuel mixture is rich 55% of the time, and lean 45% of the time. In other embodiments, different duty cycles may be desired and enacted by the engine system, as desired. If the controller determines that the duty cycle is operating outside of an acceptable duty cycle range for a predetermined amount of time, the controller indicates that one of the first and second EGO sensors is stuck. In some embodiments, the acceptable duty cycle range may be between 30% and 70% and the predetermined time is 10 seconds. In other embodiments, the acceptable duty cycle range may be between 10% and 90% and the predetermined time may be 5 seconds.

In another embodiment, the controller monitors the second EGO sensor and a prompt condition enables an intrusive stuck sensor check. The prompt condition may be an indication that the second EGO sensor is stuck according to one of the above schemes or another prompt condition such as initial engine start up. The intrusive stuck sensor check includes operating the engine at a known condition (e.g., providing a rich mixture if the second EGO sensor is stuck lean, or a lean mixture if the second EGO sensor is stuck rich). After a predetermined amount of time (e.g., 10 seconds) if the second EGO sensor has not reacted to the known condition (e.g., switching to lean or rich), then the controller indicates that the second EGO sensor is stuck.

In another embodiment, the controller checks if the second EGO sensor is stuck rich during a key-on or key-off operation. During key-on and key-off events, the catalyst should have time to fully absorb oxygen, and the reading of the second EGO sensor should therefore always indicate a lean air:fuel mixture. If the controller receives a second lambda signal indicating a rich air:fuel mixture, the controller indicates that the second EGO sensor is stuck.

Figure 1:
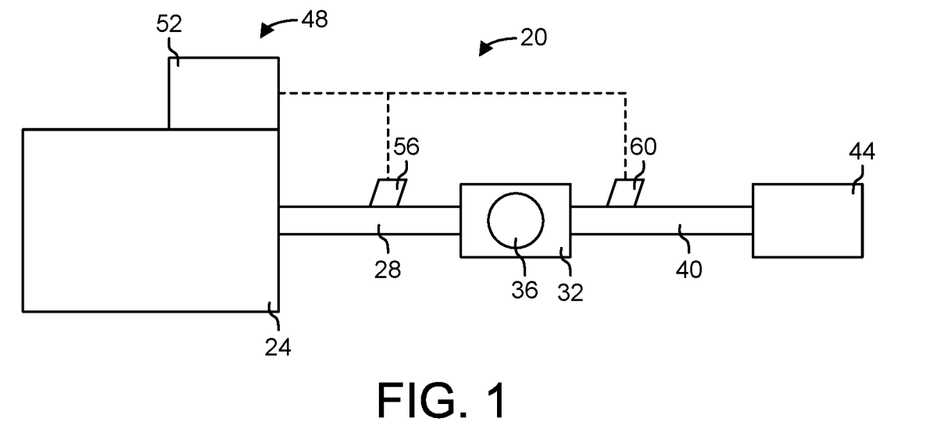
FIG. 1 is schematic diagram of an exhaust aftertreatment system with a controller, according to an example embodiment.

As shown in FIG. 1, an engine system 20 includes an engine 24, an engine exhaust pipe 28 that receives engine exhaust gases from the engine 24, a catalytic converter 32 including a catalyst 36 that receives the engine exhaust gas from the engine exhaust pipe 28 and treats the engine exhaust gases, a catalyst exhaust pipe 40 that receives the treated exhaust gases from the catalytic converter 32, and a downstream component 44 such as a muffler or another aftertreatment component. The engine system 20 also includes an engine control system 48 that includes a controller 52, a first exhaust gas oxygen sensor (EGO) 56 that communicates with the controller 52 and is positioned to detect a characteristic of the engine exhaust gas upstream on an inlet to the catalyst 36, and a second EGO 60 that communicates with the controller 52 and is positioned to detect a characteristic of the treated exhaust gas at a point downstream of the inlet of the catalyst 36. In one embodiment, the catalytic converter 32 is part of a larger exhaust aftertreatment system that may include the controller 52 and the sensors 56, 60 as well as other components.

The engine 24 can be an internal combustion engine such as a spark-ignition engine fueled by gasoline, natural gas, ethanol, propane, or another fuel suitable for spark-ignition. The engine 24 can be a compression-ignition engine fueled by diesel, or another fuel suitable for compression-ignition. The engine 24 can include a combustion chamber and an exhaust port or manifold that couples to the engine exhaust pipe 28 to contain the engine exhaust gases. Many designs and arrangements of engines and engine exhaust pipes may be used with the embodiments described herein and the engine and engine exhaust pipe shown and described are to be construed as non-limiting examples.

In one embodiment, the catalytic converter 32 includes a three-way catalyst 36 and is intended to be used with spark-ignition engines. In another embodiment, the catalyst may be a two-way catalyst intended to be used with a compression-ignition engine, or another type of catalyst that benefits from a monitoring system.

The catalyst exhaust pipe 40 and the downstream component 44 receive the treated exhaust gases from the catalytic converter 32 and may perform other emissions treatment steps, and may muffle the noise of the engine 24. The arrangement of the catalyst exhaust pipe 40 and the downstream component 44 are non-limiting examples.

Figure 2:
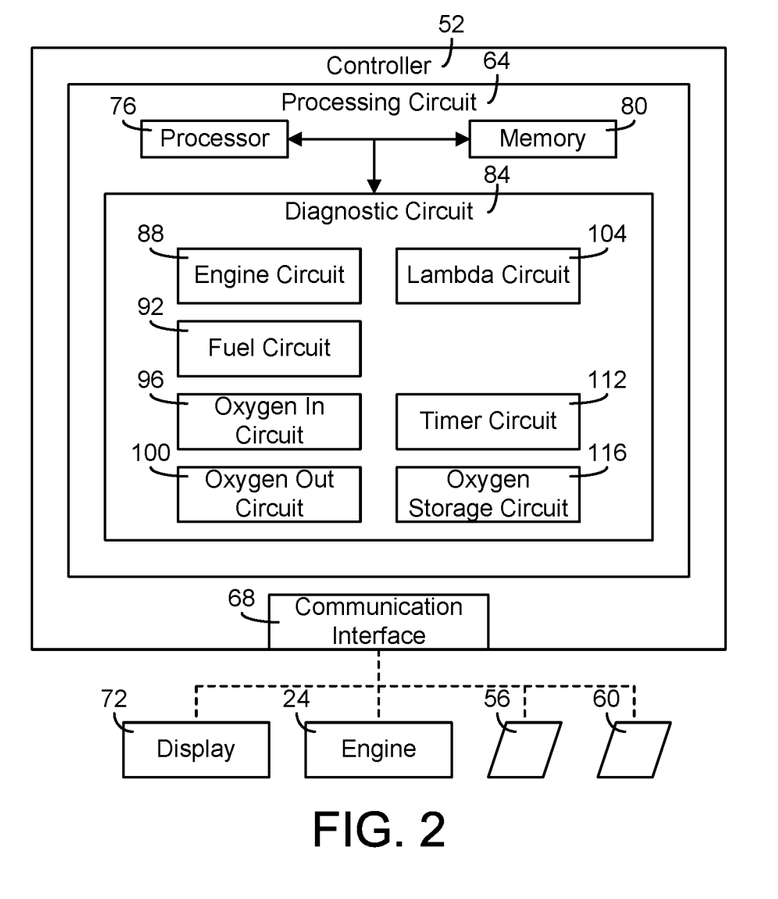
FIG. 2 is a schematic diagram of the controller used with the exhaust aftertreatment system of FIG. 1, according to an example embodiment.

As shown in FIG. 2, the controller 52 includes a processing circuit 64 and a communication interface 68 structured to communicate with the first EGO 56, the second EGO 60, the engine 24, and a display 72. The communication interface 68 may receive a first lambda signal from the first EGO 56, a second lambda signal from the second EGO 60, the engine signals from the engine 24, provide operation instructions to the engine 24 that cause the engine to perform a specific action (e.g., inject more or less fuel), and provide display or alert information to the display 72. In one embodiment, the display 72 is a data port on the engine 24 or in a vehicle associated with the engine 24.

The processing circuit 64 includes a processor 76, a memory 80, and a diagnostic circuit 84. The processor 76 can include a notification circuit, and may be implemented as a general-purpose processor, an application specific integrated circuit (ASIC), one or more field programmable gate arrays (FPGAs), a digital signal processor (DSP), a group of processing components, or other suitable electronic processing components. The memory 80 (e.g., RAM, ROM, Flash Memory, hard disk storage, etc.) may store data and/or computer code for facilitating the various processes described herein. The memory 80 may be communicably connected to the processor 76, the diagnostic circuit 84, and the communication interface 68 and structured to provide computer code or instructions to the processor 76 for executing the processes described in regard to the controller 52. Additionally, the memory 80 may be or include tangible, non-transient volatile memory or non-volatile memory. Accordingly, the memory 80 may include database components, object code components, script components, or any other type of information structure for supporting the various activities and information structures described herein.

The diagnostic circuit 84 includes various circuits (e.g., processor and memory circuits having executable code stored therein) for completing the activities described herein. More particularly, the diagnostic circuit 84 includes circuits structured to operate components of the engine 24 and the aftertreatment system. While various circuits with particular functionality are shown in FIG. 2, it should be understood that the controller 52, memory 80, and diagnostic circuit 84 may include any number of circuits for completing the functions described herein and that any number of the circuits described may be combined into a single circuit. For example, the activities and functionalities of the circuits of the diagnostic circuit 84 may be embodied in the memory 80, or combined in multiple circuits or as a single circuit. Additional circuits with additional functionality may be included. Further, it should be understood that the controller 52 may further control other vehicle activity beyond the scope of the present disclosure.

The diagnostic circuit 84 includes an engine circuit 88 structured to control various operations of the engine 24 as well as communicate with various sensors arranged in the engine 24; a fuel circuit 92 structured to monitor an amount of fuel provided to the engine 24 or a characteristic of the fuel provided to the engine 24; an oxygen in circuit 96 structured to communicate with the first EGO 56 and to analyze the first lambda signal; an oxygen out circuit 100 structured to communicate with the second EGO 60 and to analyze the second lambda signal; a lambda circuit 104 structured to communicate with the engine circuit 88, the fuel circuit 92, the oxygen in circuit 96, and the oxygen out circuit 100 and to analyze the received signals; a timer circuit 112; and an oxygen storage circuit 116 structured to communicate with the lambda circuit 104 and the timer circuit 112 to analyze a response of the catalyst 36 to engine operation.

Figure 3:
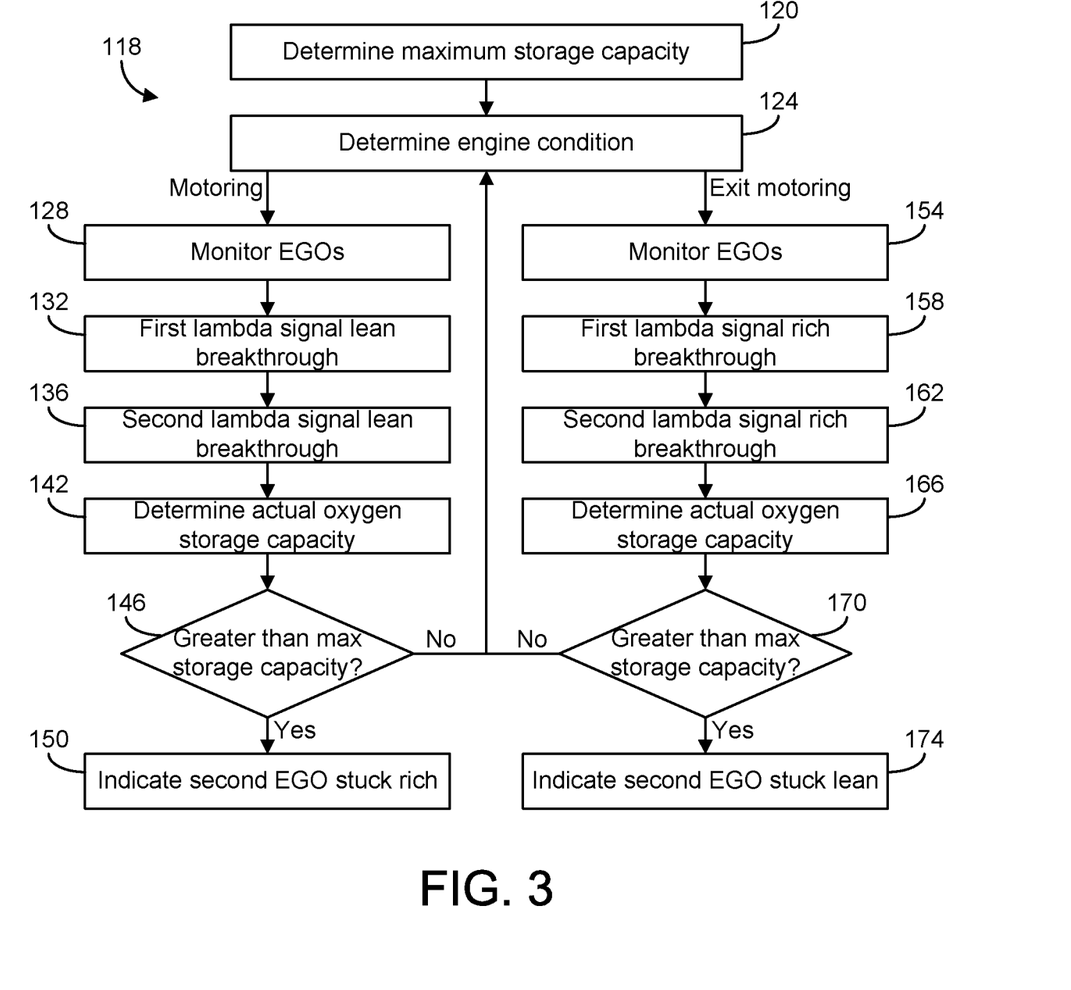
FIG. 3 is a flow chart illustrating a method of diagnosing a stuck exhaust gas oxygen sensor (EGO), according to an example embodiment.

As shown in FIG. 3, a method 118 of determining a stuck EGO sensor includes determining a maximum storage capacity of the catalyst 36 in step 120. The maximum storage capacity corresponds to the amount of oxygen that a new catalyst 36 can hold. Over the life span of the catalyst 36, the oxygen storage capacity of the catalyst 36 will decrease, so the maximum storage capacity represents the actual maximum amount of oxygen that the catalyst 36 will ever be able to hold in reality. In some embodiments, determining the maximum storage capacity includes querying the memory 80 with the oxygen storage circuit 116 to identify a predetermined or saved maximum storage capacity. In some embodiments, the memory 80 is a database that is located within the controller 52. In some embodiments, the database is located remotely from the controller 52 and may be queried by the controller 52 to determine the maximum storage capacity. In some embodiments, the maximum storage capacity is determined by the oxygen storage circuit 116 when the catalyst 36 is first installed. In some embodiments, the determination of the maximum storage capacity of oxygen is based at least in part on an oxygen flux flowing through the catalyst 36 as determined by the first EGO 56 and the second EGO 60, and the oxygen in circuit 96 and the oxygen out circuit 100. In one embodiment, the maximum oxygen capacity is about ten grams (10 g). In other embodiments, the maximum storage capacity is between about seven grams and about thirteen grams (7-13 g). It will be appreciated that other maximum storage capacities are possible for other catalysts.

Once the maximum storage capacity is determined, the controller 52 determines the operational condition of the engine 24 at step 124 by communicating with the fuel circuit 92 and the engine circuit 88. If the fuel circuit 92 determines that no fuel is being provided to the engine 24 and the engine circuit 88 determines that the engine 24 is still running, then the controller 52 determines that the engine 24 is in a motoring condition. If the fuel circuit 92 determines that fuel is being provided to the engine 24, the engine circuit 88 determines that the engine 24 is still running, and the controller 52 recognizes that the previous operating condition was a motoring condition, then the controller 52 determines that the engine 24 is in an exit motoring condition.

If the controller 52 determines the engine 24 is in a motoring condition, then the first EGO 56 and the second EGO 60 are monitored at step 128. During monitoring, the first lambda signal is received by the oxygen in circuit 96 and the second lambda signal is received by the oxygen out circuit 100, and the first lambda signal and the second lambda signal are processed by the lambda circuit 104 to determine a first lambda $\lambda_1$ indicative of the air:fuel mixture sensed by the first EGO 56 and a second lambda $\lambda_2$ indicative of the air:fuel mixture sensed by the second EGO 60.

At step 132, the first lambda $\lambda_1$ experiences a first lean breakthrough. At step 136, the second lambda $\lambda_2$ experiences a second lean breakthrough. The oxygen storage circuit 116 communicates with the lambda circuit 104 and the timer circuit 112 to identify the first lean breakthrough and the second lean breakthrough. At step 142, the oxygen storage circuit 116 determines an actual storage capacity of the catalyst 36 based on the first lean breakthrough and the second lean breakthrough. The actual storage capacity may be calculated at least in part on the timing of the second lean breakthrough relative to the first lean breakthrough.

Figure 4:
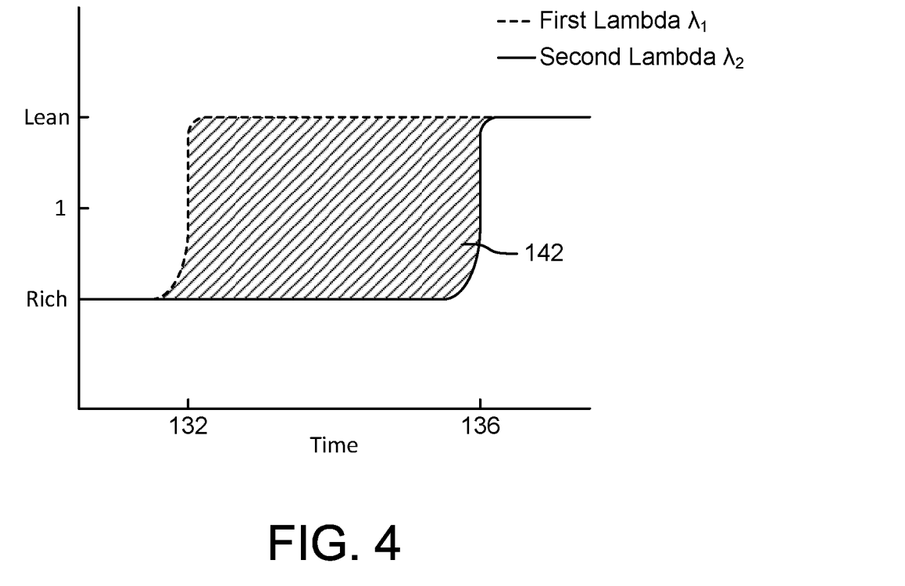
FIG. 4 is a graph illustrating a first lambda associated with a first EGO sensor and a second lambda associated with a second EGO sensor over time during operation of the method of FIG. 3, according to an example embodiment.

FIG. 4 illustrates the first lambda $\lambda_1$ and the second lambda $\lambda_2$ experiencing lean breakthroughs at different times. The first lean breakthrough is indicated as occurring at time 132 corresponding to step 132 and the second lean breakthrough is indicated as occurring at time 136 corresponding to step 136. The actual storage capacity is indicated at 142 as the integral between the first lean breakthrough and the second lean breakthrough.

As shown in FIG. 3, at step 146, the oxygen storage circuit 116 compares the actual oxygen storage capacity to the maximum storage capacity. If the actual storage capacity is greater than the maximum storage capacity, a fault notification is generated at step 150 and a notification is sent from the communication interface 68 to the display 72 to alert the user that the second EGO 60 is stuck rich. In one embodiment, the fault notification is generated if the actual storage capacity greater than the maximum storage capacity by a threshold value. In some embodiments, the threshold value is about five times the maximum storage capacity (i.e., threshold value=5×maximum storage capacity). In some embodiments, the threshold value is a fixed value (e.g., fifty grams). If the actual storage capacity is not greater than the maximum storage capacity, then the method returns to step 124.

If the controller 52 determines that the engine 24 is in the exit motoring condition at step 124, then the first EGO 56 and the second EGO 60 are monitored at step 154. At step 158, the first lambda $\lambda_1$ experiences a first rich breakthrough. At step 162, the second lambda 2 experiences a second rich breakthrough. The oxygen storage circuit 116 communicates with the lambda circuit 104 and the timer circuit 112 to identify the first rich breakthrough and the second rich breakthrough. At step 166, the oxygen storage circuit 116 determines an actual storage capacity of the catalyst 36 based on the first rich breakthrough and the second rich breakthrough. The actual storage capacity may be calculated at least in part on the timing of the second rich breakthrough relative to the first rich breakthrough.

Figure 5:
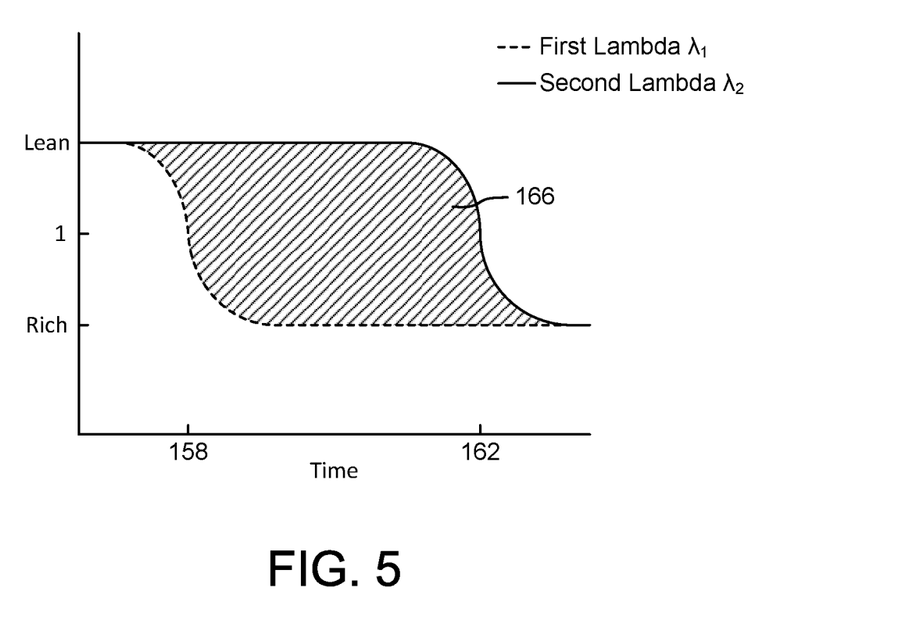
FIG. 5 is a graph illustrating a first lambda associated with a first EGO sensor and a second lambda associated with a second EGO sensor over time during operation of the method of FIG. 3, according to an example embodiment.

FIG. 5 illustrates the first lambda $\lambda_1$ and the second lambda 2 experiencing rich breakthroughs at different times. The first rich breakthrough is indicated as occurring at time 158 corresponding to step 158 and the second rich breakthrough is indicated as occurring at time 162 corresponding to step 162. The actual storage capacity is indicated at 166 as the integral between the first rich breakthrough and the second rich breakthrough.

As shown in FIG. 3, at step 170, the oxygen storage circuit 116 compares the actual oxygen storage capacity to the maximum storage capacity. If the actual storage capacity is greater than the maximum storage capacity, a fault notification is generated at step 174 and a notification is sent from the communication interface 68 to the display 72 to alert the user that the second EGO 60 is stuck lean. If the actual storage capacity is not greater than the maximum storage capacity, then the method returns to step 124.

Figure 6:
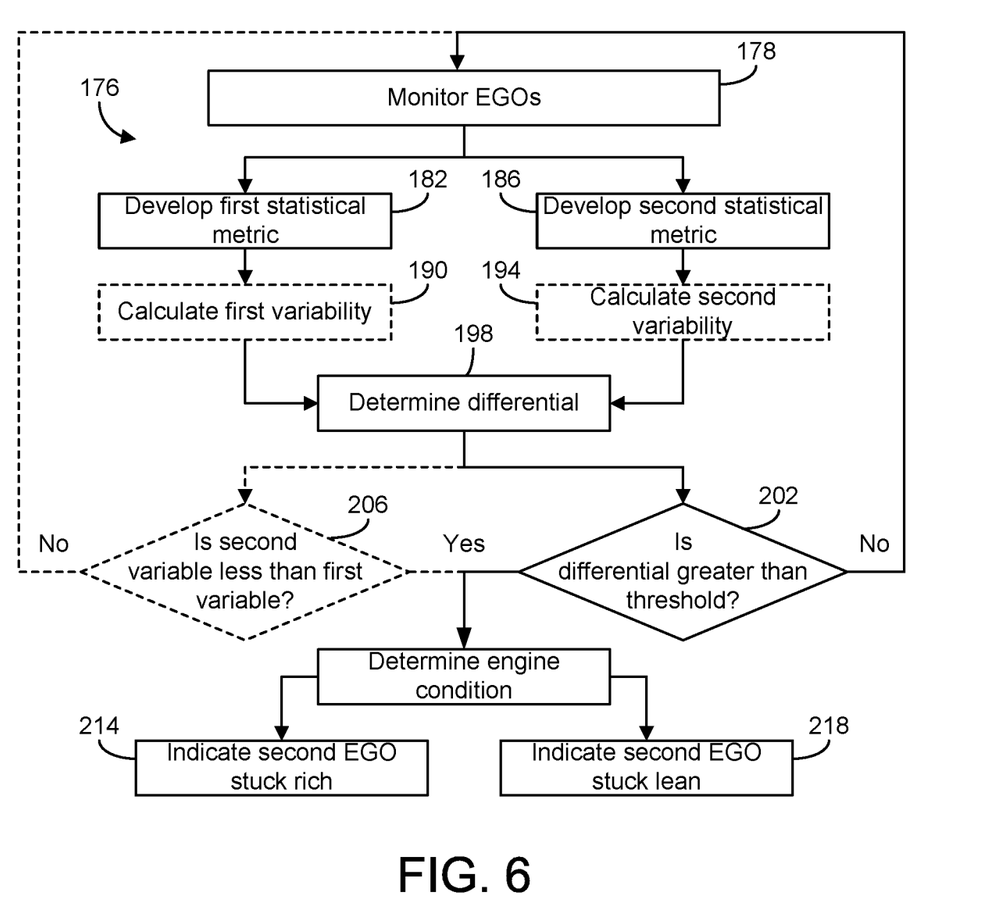
FIG. 6 is a flow chart illustrating a method of diagnosing a stuck EGO sensor, according to an example embodiment.

As shown in FIG. 6, a method 176 of determining a stuck EGO sensor includes monitoring the first EGO 56 and the second EGO 60 and determining the first lambda $\lambda_1$ and the second lambda $\lambda_2$ with the lambda circuit 104 at step 178. At step 182, a first statistically metric is determined by the controller 52 based on the first lambda $\lambda_1$. In some embodiments, the first statistical metric is a median lambda value (e.g., 1.4 would indicate a lean median, 0.5 would indicate a rich median). In some embodiments, the first statistical metric is a mean lambda value. In some embodiments another statistic metric may be used, such as a duty cycle. At step 186, a second statistical metric is determined by the controller 52 based on the second lambda $\lambda_2$. The second statistical metric is the same as the first statistical metric (e.g., median, mean, duty cycle).

In some embodiments, a first variability of the first statistical metric is determined by the controller 52 at step 190 and a second variability of the second statistical metric is determined by the controller 52 at step 194. The first variability and the second variability may be statistical tools such as standard deviations, bandwidth calculations, or other variability measures, as desired.

At step 198, a statistical metric differential is determined by the controller 52 by comparing the first statistical metric to the second statistical metric. At step 202, the statistical metric differential is compared to a predetermined threshold. If the statistical metric differential is less than the predetermined threshold, then the method returns to step 178 and continues monitoring. In some embodiments, the controller 52 also compares the first variability to the second variability at step 206, and if the second variability is not less than the first variability, then the method returns to step 178 and continues monitoring.

If the controller 52 determines at step 202 that the statistical metric differential is greater than the predetermined threshold, then the controller 52 checks the engine 24 to determine the operational condition at step 210. In some embodiments, the controller 52 verifies that the second variability is less than the first variability before progressing to step 210. In other embodiments, the variability comparison of step 206 replaces step 202.

If the controller 52 determines at step 210 that the engine 24 is operating in the motoring condition, then a fault notification is generated at step 214 and a notification is sent from the communication interface 68 to the display 72 to alert the user that the second EGO 60 is stuck rich. If the controller 52 determines at step 210 that the engine 24 is operating in the dithering condition, then a fault notification is generated at step 218 and a notification is sent from the communication interface 68 to the display 72 to alert the user that the second EGO 60 is stuck lean.

Figure 7:
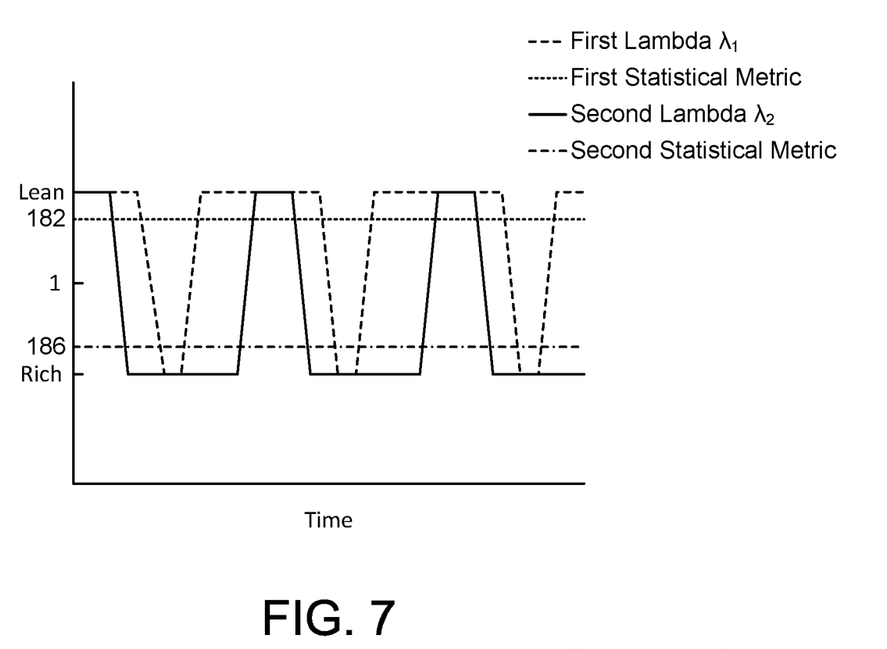
FIG. 7 is a graph illustrating a first lambda associated with a first EGO sensor and a second lambda associated with a second EGO sensor over time during operation of the method of FIG. 6, according to an example embodiment.

As shown in FIG. 7, the method 176 monitors the first lambda $\lambda_1$ and the second lambda 2 over time. The first statistical metric is based at least in part on the stoichiometric breakthroughs of the first lambda signal and the second lambda signal. The first statistical metric is shown as a median over time at line 182 corresponding to step 182, while the second statistical metric is shown as a median over time at line 186 corresponding to step 186. If the controller 52 determines at step 202 that the differential between the median shown at line 186 and the median shown at line 182 is greater that the predetermined threshold, a fault signal is generated. FIG. 7 illustrates an example of the second EGO 60 stuck rich.

Figure 8:
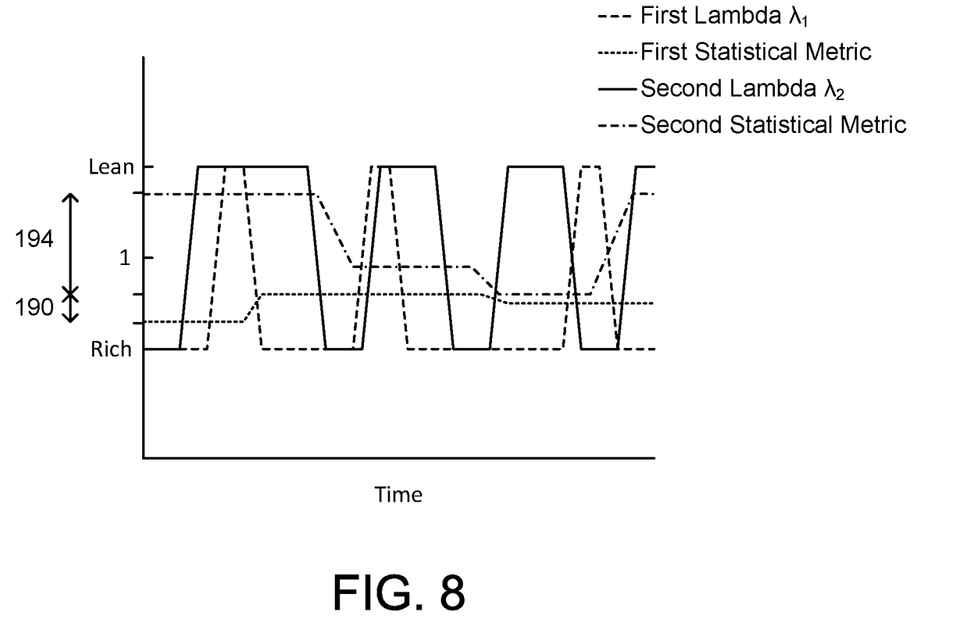
FIG. 8 is a graph showing a first lambda associated with a first EGO sensor and a second lambda associated with a second EGO sensor over time during operation of the method of FIG. 6, according to an example embodiment.

As shown in FIG. 8, the first variability (shown as range 190 corresponding to step 190) can be measured over a predetermined amount of time, and the second variability (shown as range 194 corresponding to step 194) can be measured over the same predetermined amount of time. If the second EGO 60 is functioning normally, the second lambda signal should indicate a larger variability in the second lambda $\lambda_2$ than the first lambda $\lambda_1$. If the second lambda $\lambda_2$ has a smaller variability than the first lambda $\lambda_1$ then the second EGO 60 is stuck and not reading accurately. FIG. 8 illustrates an example of the second EGO 60 stuck lean.

Figure 9:
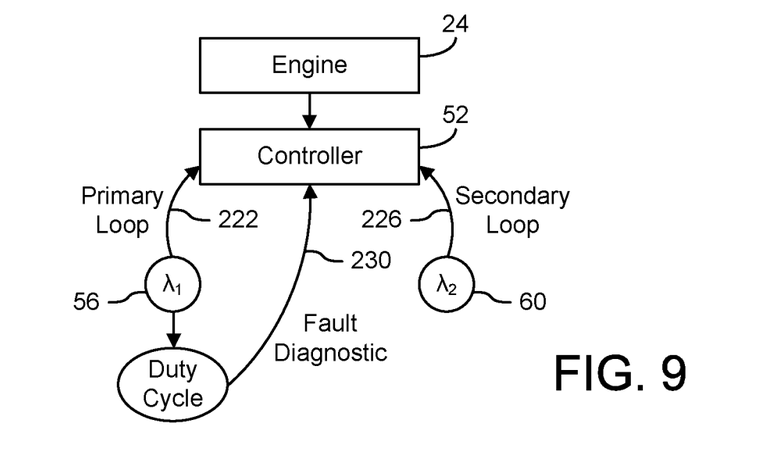
FIG. 9 is a schematic illustration of feedback loops used by the exhaust aftertreatment system of FIG. 1, according to an example embodiment.

As shown in FIG. 9, the engine 24 is controlled by the controller 52 at least in part based on a primary feedback loop 222 communicating with the first EGO 56, a secondary feedback loop 226 communicating with the second EGO 60, and a fault diagnostic method 230. The fault diagnostic method 230 is based on a duty cycle of the first lambda $\lambda_1$ determined by the lambda circuit 104. The primary feedback loop 222 is used to control the engine 24 to achieve a stoichiometric balance at the inlet to the catalyst 36. In other words, the controller 52 sends control signals to the engine 24 such that the first lambda $\lambda_1$ is one or another desired value (e.g., 0.95). The secondary feedback loop 226 is also used to control the engine 24 but the variability of the second lambda $\lambda_2$ is larger and the control signal sent to the engine 24 from the controller 52 accounts for corrective action or secondary controls based on the second feedback loop 226, rather than the primary control provided by the primary feedback loop 222.

Figure 10:
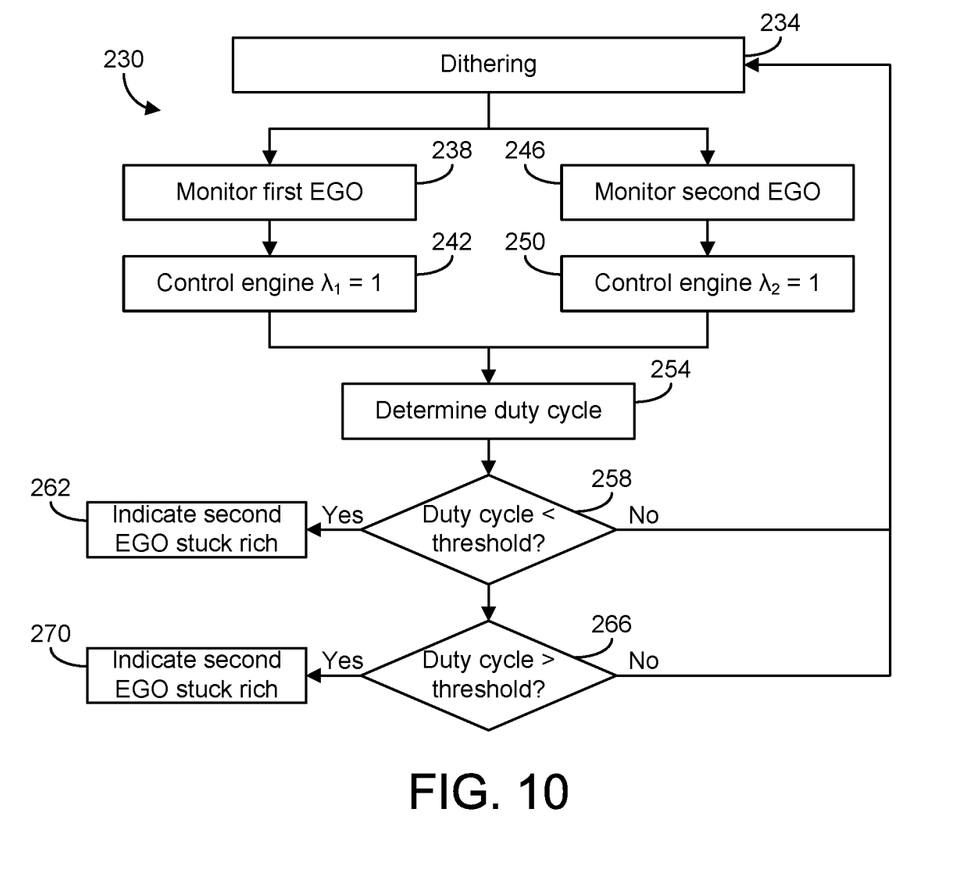
FIG. 10 is a flow chart illustrating a method of diagnosing a stuck EGO sensor, according to an example embodiment.

As shown in FIG. 10, the method 230 first determines that the engine 24 is operating in the dithering condition with the controller 52 at step 234. If the engine 24 is operating in a dithering condition, then the first EGO 56 is monitored at step 238. The oxygen in circuit 96 receives the first lambda signal, and the lambda circuit 104 determines the first lambda $\lambda_1$. Then the controller 52 sends a primary control signal (i.e., the primary feedback loop 222) to the engine 24 to maintain the first lambda $\lambda_1$ at a desired control lambda (e.g., 1.0, 0.95) at step 242.

The second EGO 60 is monitored concurrently at step 246, and the oxygen out circuit 100 receives the second lambda signal. The lambda circuit 104 then determines the second lambda 2. Then the controller 52 sends a secondary control signal (i.e., the secondary feedback loop 226) to the engine 24 to maintain the second lambda $\lambda_2$ within a desired lambda range (e.g., between 0.5 and 1.5) at step 250.

At step 254, the fault diagnostic 230 of the controller 52 determines a duty cycle of the first lambda $\lambda_1$. As discussed above, the duty cycle is indicative of a rich:lean ratio over time. During normal operation, the duty cycle will correspond to the desired control lambda (e.g., 50% duty cycle, 52% duty cycle). At step 258, the duty cycle is compared to a duty cycle range. The duty cycle range is a predetermined range of duty cycle values that indicate normal operation. In some embodiments, the duty cycle range is between about 40% and about 60%. In some embodiments, the duty cycle range is between about 30% and about 70%. In some embodiments, the duty cycle range is between about 10% and about 90%. If the duty cycle is determined to be less than the duty cycle range at step 258, then a fault notification is generated at step 262 and a notification is sent from the communication interface 68 to the display 72 to alert the user that the second EGO 60 is stuck rich.

If the duty cycle is determined to be greater than the duty cycle range at step 266, then a fault notification is generated at step 270 and a notification is sent from the communication interface 68 to the display 72 to alert the user that the second EGO 60 is stuck lean.

The method 230 takes advantage of the control signals based on the primary feedback loop 222 and the secondary feedback loop 226 to diagnose the second EGO 60. If the second EGO 60 is stuck rich, it will continually cause the secondary control signal sent by the controller 52 to instruct the engine 24 to run lean. This in turn will cause the duty cycle of the first EGO 56 to drop outside the duty cycle range (e.g., the duty cycle drops to 25%). This drop in duty cycle will be recognized at step 258, and the controller 52 will indicate that the second EGO 60 is stuck rich. If the second EGO 60 is stuck lean, it will continually cause the secondary control signal sent by the controller 52 to instruct the engine 24 to run rich. This in turn will cause the duty cycle of the first EGO 56 to rise outside the duty cycle range (e.g., the duty cycle rises to 75%). This rise in duty cycle will be recognized at step 266, and the controller 52 will indicate that the second EGO 60 is stuck lean.

Figure 11:
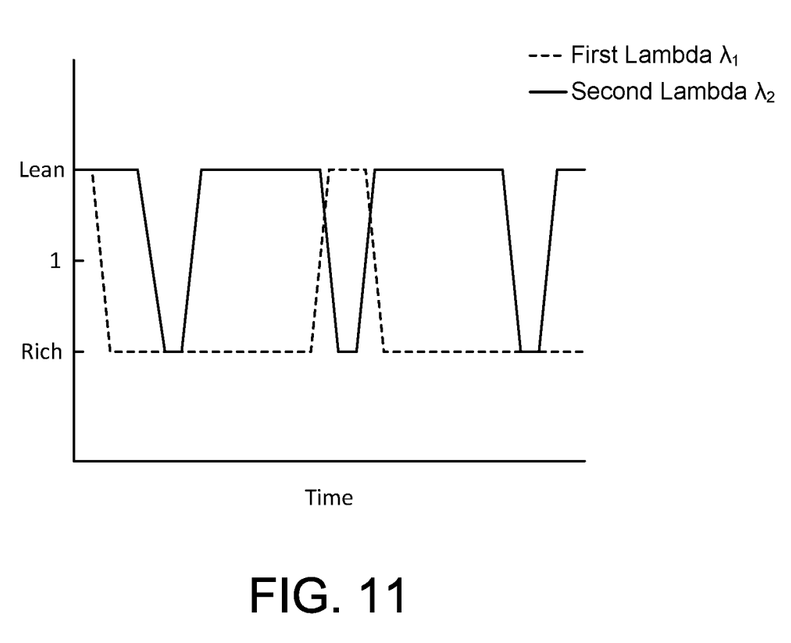
FIG. 11 is a graph showing a first lambda associated with a first EGO sensor and a second lambda associated with a second EGO sensor over time during operation of the method of FIG. 10, according to an example embodiment.

FIG. 11 illustrates an example of a second EGO 60 that is stuck lean causing the duty cycle to skew rich (e.g., 75%). This shift in duty cycle is recognized by the controller 52 at step 266 and a notification is sent to the display 72 indicating that the second EGO 60 is stuck lean.

Figure 12:
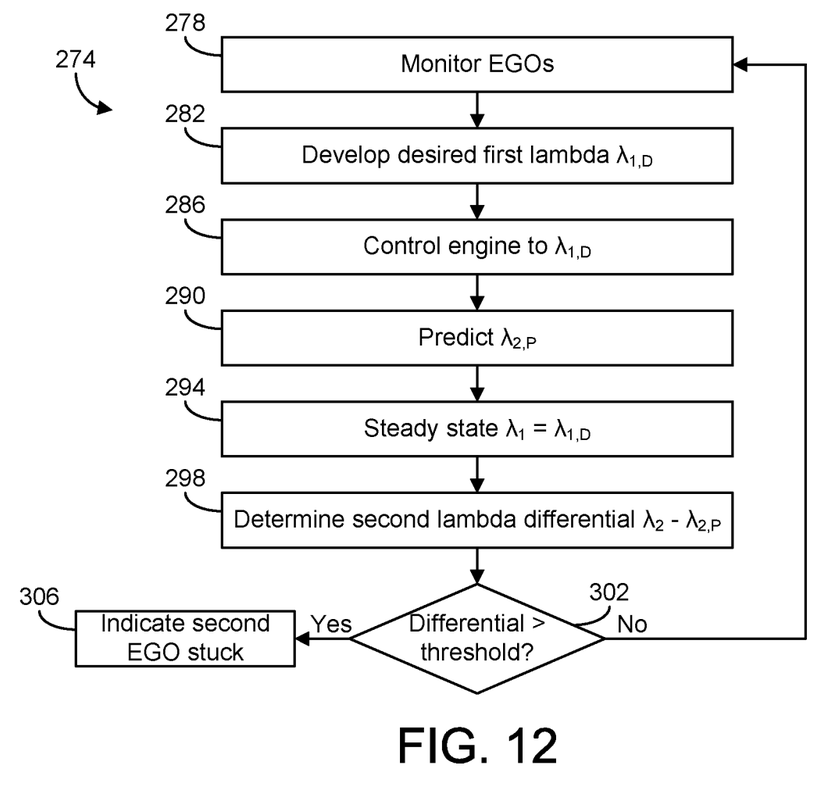
FIG. 12 is a flow chart illustrating a method of diagnosing a stuck EGO sensor, according to an example embodiment.

As shown in FIG. 12, a method 274 of determining a stuck EGO sensor includes monitoring the first EGO 56 and the second EGO 60 with the controller 52 at step 278. During monitoring, the oxygen in circuit 96 receives the first lambda signal, and the lambda circuit 104 determines the first lambda and the oxygen out circuit 100 receives the second lambda signal, and the lambda circuit 104 determines the second lambda 2.

At step 282, the controller 52 develops a desired first lambda $\lambda_{1,D}$ and sends a first control signal to the engine 24 to produce the desired first lambda $\lambda_{1,D}$ as measured by the first EGO 56 at step 286. Based on the desired first lambda $\lambda_{1,D}$, the controller 52 develops an expected or a predicted second lambda $\lambda_{2,P}$ at step 290.

The controller 52 then continues to monitor the first EGO 56 and the second EGO 60, and compares the first lambda $\lambda_1$ to the desired first lambda $\lambda_{1,D}$ at step 294 until the first lambda $\lambda_1$ is equal to the desired first lambda $\lambda_{1,D}$ and has reached steady state. Once the first lambda $\lambda_1$ equals desired first lambda $\lambda_{1,D}$ and has reached steady state, the controller determines a second signal differential between the second lambda $\lambda_2$ and the predicted second lambda $\lambda_{2,P}$ at step 298.

At step 302, the controller 52 compares the second signal differential to a threshold differential. If the second signal differential is less than the threshold differential, the method 274 returns to step 278 and continues monitoring. If the second signal differential is not less than the threshold differential, a fault notification is generated at step 306 and a notification is sent from the communication interface 68 to the display 72 to alert the user that the second EGO 60 is stuck. In some embodiments, the threshold differential is about 0.7. In some embodiments, the threshold differential is about 0.5. In some embodiments, the controller 52 uses an absolute value for the second signal differential for comparison to the threshold differential. In some embodiments, the value of the second lambda $\lambda_2$ is used to determine if the second EGO 60 is stuck rich or lean.

In one example, the first control signal instructs the engine 24 to run rich to achieve a desired first lambda $\lambda_{1,D}$ of about 0.5. The predicted second lambda $\lambda_{2,P}$ is about 0.6. The controller 52 then determines that the actual second lambda $\lambda_2$ is about 1.3 and that the second signal differential is about 0.7. The controller 52 compares the second signal differential to the threshold differential of 0.5 and identifies that the second EGO 60 is stuck. The controller 52 may also identify that the second EGO 60 is stuck lean because the second lambda $\lambda_2$ is greater than one. The notification is the sent to the display 72 indicating that the second EGO 60 is stuck lean.

Figure 13:
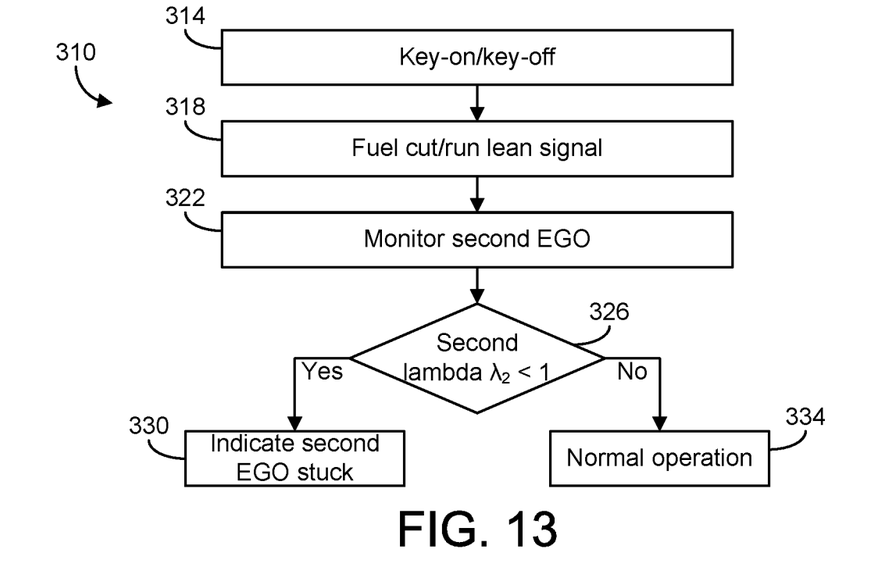
FIG. 13 is a flow chart illustrating a method of diagnosing a stuck EGO sensor, according to an example embodiment.

As shown in FIG. 13, a method 310 provides a diagnostic solution for the second EGO 60 at key-on and key-off conditions. For example, a user first starting the engine 24 may be considered a key-on condition, and the engine 24 being shut off or stopped may be considered a key-off condition. At step 314, the controller 52 recognizes a key-on or a key-off condition. At step 318, the controller 52 sends a control signal to the engine 24 to operate in one of a fuel cut or a run lean condition. In the case of a key-on condition, the controller 52 may check to determine an off time (e.g., via communication with the timer circuit 112) since the last key-off condition. If the off time is equal to or greater than a predetermined rest time, the controller 52 assumes that the catalyst 36 has had time to fully oxidize or adsorb a full storage capacity of oxygen and sends the control signal to operate the engine 24 in a run lean condition. In the case of a key-off condition, the controller 52 sends the signal to operate the engine 24 in a fuel cut condition for a predetermined fuel cut time intended to provide the catalyst 36 adequate time to fully oxidize or adsorb a full storage capacity of oxygen. After the control signal is sent at step 318, the controller 52 monitors the second EGO 60 at step 322.

At step 326, the controller 52 compares the second lambda 2 to a stoichiometric balance (e.g., 1.0). If the second lambda 2 is greater than the stoichiometric balance, then the controller 52 indicates that the second EGO 60 is stuck rich and a fault notification is generated at step 330 and a notification is sent from the communication interface 68 to the display 72 to alert the user that the second EGO 60 is stuck rich. If the second lambda $\lambda_2$ is equal to or less than the stoichiometric balance, then the controller 52 operates the engine 24 normally, either by continuing to run, or stopping at step 334.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings, and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
  a processing circuit structured to:
    determine a motoring condition for an engine;
    receive, in response to determining the motoring condition, a first signal indicative of an upstream air-fuel equivalence ratio from a first sensor positioned upstream of an intake of a catalyst;

receive, in response to determining the motoring condition, a second signal indicative of a downstream air-fuel equivalence ratio from a second sensor positioned downstream of the intake of the catalyst;

determine, in response to determining the motoring condition, a lean breakthrough based on the first signal and the second signal;

determine an actual oxygen storage capacity of the catalyst based at least in part on the lean breakthrough;

compare the actual oxygen storage capacity to a maximum storage capacity; and provide a fault signal in response to the actual oxygen storage capacity exceeding the maximum storage capacity; and a notification circuit structured to provide a notification indicating that the second sensor is faulty in response to receiving the fault signal.

2. The apparatus of claim 1, wherein determining the actual oxygen storage capacity includes determining a storage capacity over time based on the upstream air-fuel equivalence ratio and the downstream air-fuel equivalence ratio.

3. The apparatus of claim 1, wherein the maximum storage capacity corresponds to a maximum storage capacity of a new catalyst.

4. The apparatus of claim 1, further comprising a database storing a maximum storage capacity value associated with the catalyst, the maximum storage capacity value based on a predetermined maximum storage capacity.

5. The apparatus of claim 1, wherein the maximum storage capacity is set during initial installation of the catalyst.

6. The apparatus of claim 1, wherein the maximum storage capacity is less than a predefined number of grams of oxygen.

7. The apparatus of claim 6, wherein the predefined number of grams of oxygen is 13 grams of oxygen.

8. The apparatus of claim 1, wherein the actual oxygen storage capacity is based at least in part on an oxygen flux through the catalyst measured by the first sensor and the second sensor until a stoichiometric breakthrough of the second sensor.

9. The apparatus of claim 1, wherein exceeding the maximum storage capacity includes exceeding a threshold, and wherein the threshold is at least one of a predefined number of times the maximum storage capacity or a predefined value.

10. The apparatus of claim 1, wherein the fault signal is only provided during at least one of the motoring condition or an exit motoring condition.

11. The apparatus of claim 1, wherein the processing circuit is further structured to:

determine an exit-motoring condition for the engine;

receive, in response to determining the exit-motoring condition, a third signal indicative of the upstream air-fuel equivalence ratio from the first sensor positioned upstream of the intake of the catalyst;

receive, in response to determining the exit-motoring condition, a fourth signal indicative of the downstream air-fuel equivalence ratio from the second sensor positioned downstream of the intake of the catalyst; and determine, in response to determining the exit-motoring condition, a rich breakthrough based on the third signal and the fourth signal.

12. The apparatus of claim 11, wherein the processing circuit is further structured to determine the actual oxygen storage capacity of the catalyst based at least in part on the rich breakthrough.

* * * * *